United States Patent [19]

Piggin

[11] Patent Number: 4,475,933
[45] Date of Patent: Oct. 9, 1984

[54] FILTER DEVICE FOR REMOVING PARTICULATE MATERIAL FROM GASES

[75] Inventor: Peter R. Piggin, Burton Overy, England

[73] Assignee: Air Pollution (Equipment) Limited, Leicester, England

[21] Appl. No.: 409,065

[22] Filed: Aug. 18, 1982

Related U.S. Application Data

[63] Continuation of Ser. No. 247,556, Mar. 25, 1981, abandoned.

[30] Foreign Application Priority Data

Feb. 13, 1981 [GB] United Kingdom ............... 8104571

[51] Int. Cl.³ .................. B01D 46/04; B01D 50/00
[52] U.S. Cl. ................................ 55/287; 55/288; 55/302; 55/319; 55/324; 55/334
[58] Field of Search ........................... 55/286–288, 55/294, 302, 303, 319, 324, 334, 431

[56] References Cited

U.S. PATENT DOCUMENTS

| | | | |
|---|---|---|---|
| 2,776,204 | 1/1957 | Fowler | 55/294 |
| 3,803,814 | 4/1974 | Parsons, Jr. | 55/287 |
| 3,871,845 | 3/1975 | Clarke et al. | 55/294 |
| 4,154,589 | 5/1979 | Crawford et al. | 55/287 |

FOREIGN PATENT DOCUMENTS

| | | | |
|---|---|---|---|
| 1407945 | 9/1970 | Fed. Rep. of Germany | 55/302 |
| 7308668 | 12/1974 | Netherlands | 55/302 |
| 1462211 | 1/1977 | United Kingdom | 55/287 |

Primary Examiner—David L. Lacey
Attorney, Agent, or Firm—Charles E. Brown

[57] ABSTRACT

Particle-laden gas passes downwardly through an inlet duct into inlets of several wedge-shaped deceleration chambers formed by vertical plates radiating from a central region below the bottom of the inlet duct. The inner ends of the plates and the inlet of the chambers are vertically below the bottom of the inlet duct. In each chamber the gas first proceeds towards a particle exit at the bottom of the chamber, then reverses direction and passes upwardly into filter units above wider parts of the chamber, depositing some heavy particles near the particle exit. To purge the chambers and filter units, a suction device is connected to an outlet duct and one or more inlets to the chambers are closed off from the inlet duct simultaneously with the particle exit(s) of the same chamber(s) being connected to the outlet duct.

7 Claims, 7 Drawing Figures

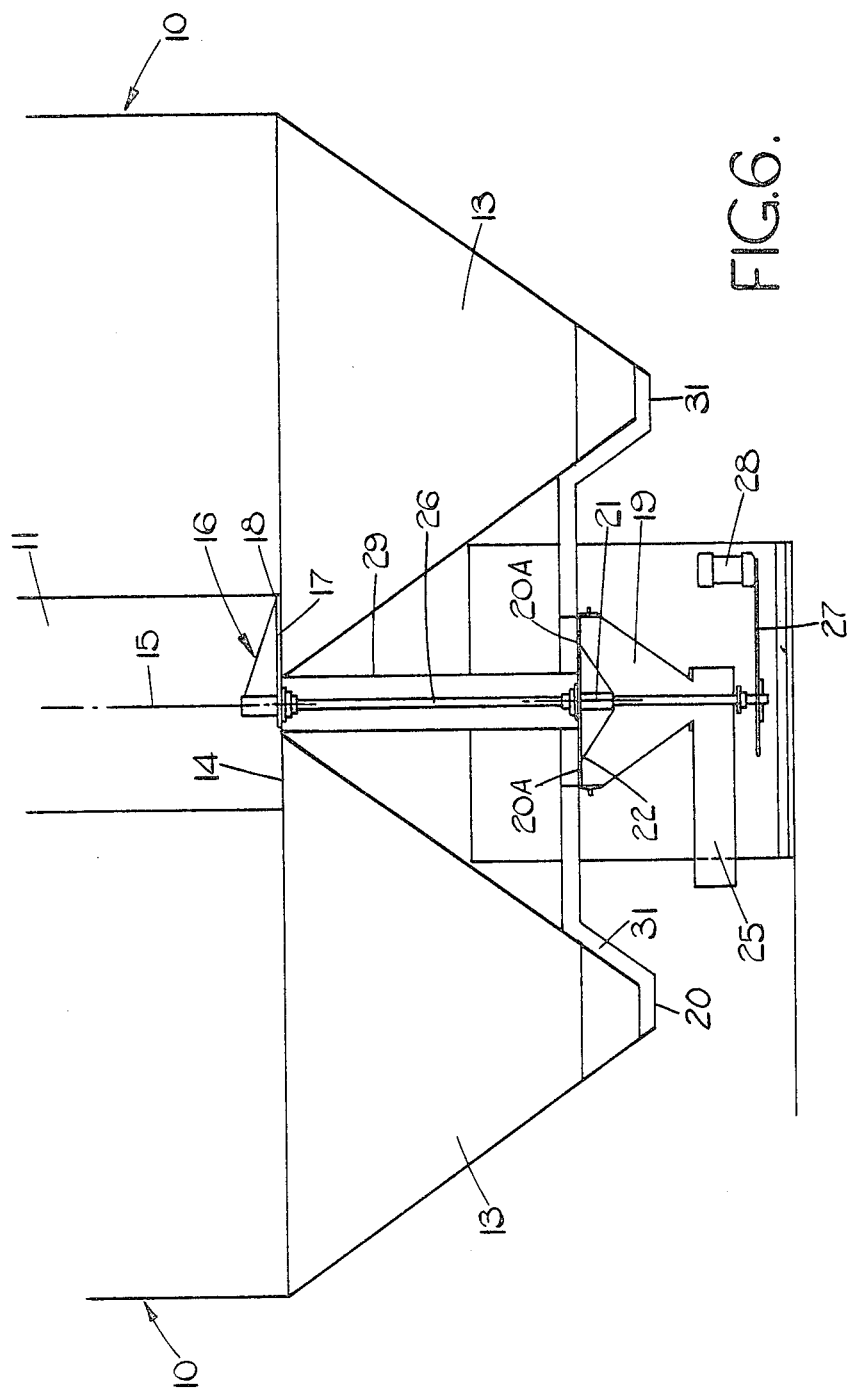

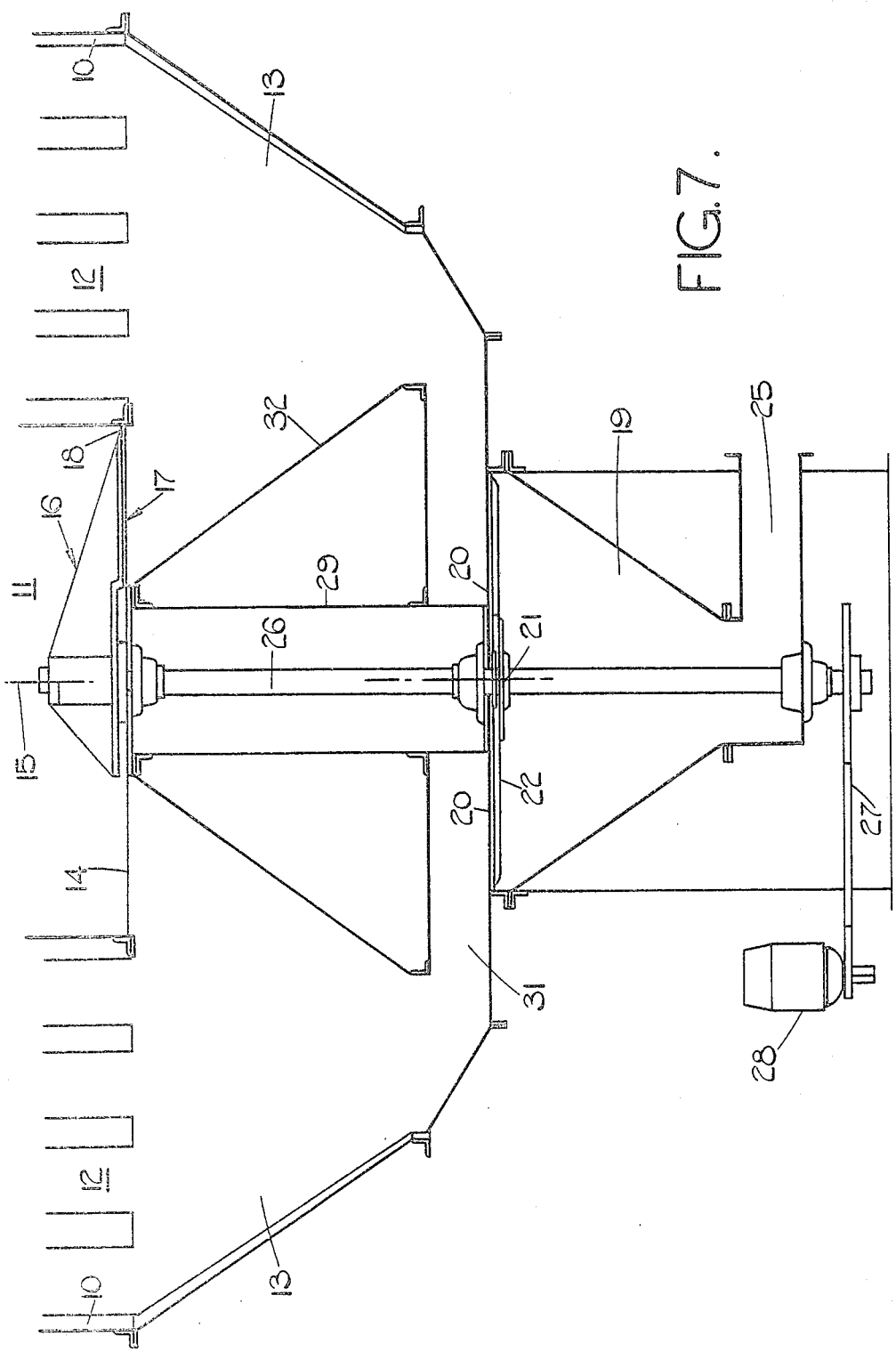

FILTER DEVICE FOR REMOVING PARTICULATE MATERIAL FROM GASES

This is a continuation of application Ser. No. 247,556 filed Mar. 25, 1981, now abandoned.

FIELD OF THE INVENTION

It has already been proposed, see FIG. 3 of British Patent Specification No. 1,462,211, to provide a filter device for removing particles from a particle-laden gas, the filter device comprising an inlet duct through which a particle-laden gas is passed downwardly, a plurality of filter units distributed about said inlet duct, a plurality of chambers distributed around the axis of the inlet duct and near the bottom of the inlet duct which receive, through inlets of the chambers, particle-laden gas from the inlet duct, each of said chambers having at its top a gas exit to one of the filter units and having at its bottom a removed particle exit, a first baffle mounted to be turned about a vertical axis for closing off the inlets successively as the first baffle is turned, an outlet duct for carrying away particles removed from said chambers and filter units via the removed particle exits by suction means which can be coupled to the outlet duct, a second baffle mounted to be turned about a substantially vertical axis for connecting the removed particle exits successively to the outlet duct while the other removed particle exits are closed off from the outlet duct, and drive means for turning the first and second baffles in synchronism so that when the inlet of one chamber is closed off from the inlet duct the removed particle exit of the same chamber is connected to the outlet duct.

The gas filter device according to the present invention is as defined above but it is characterized in that the chambers are formed between vertical plates which radiate outwardly from a central region which is vertically below the bottom of the inlet duct, so that the chambers are wedge-shaped and their inner narrow sides are vertically below the bottom of the inlet duct, the inlets of the chambers being at the tops of the inner sides of the chambers and vertically below the bottom of the inlet duct whereas the gas exits are at the tops of wider parts of the chambers, whereby particle-laden gas entering each chamber first moves towards the removed particle exit and then substantially reverses its flow direction to exit through the gas exit, leaving behind some large particles at the bottom of the chamber, and in that the first baffle is above and adjacent the inlets.

The removed particle exits of a gas filter device according to the present invention are preferably vertically below the bottom of the inlet duct and preferably in each chamber there is a clear, unimpeded vertical passage from the inlet to the removed particle exit.

In the gas filter device shown in FIG. 3 of British Patent Specification No. 1,462,211 a number of horizontal connections, of undisclosed shape but possibly short pipes of circular cross-section, radiate outwardly from the side of the inlet duct at the bottom thereof and open into the chambers at vertical side walls thereof, near the tops of the chambers. It is ture that the particle-laden gas flows downwardly in the inlet duct and upwardly into the filer units but this is caused by two changes by 90° of the direction of gas flow, since the gas flows horizontally through the connections between the inlet duct and the chambers. The resultant reversal of flow of the gas would not result in precipitation here of a large number of particles and of those which are precipitated here many would lie on the bottom of the horizontal connections between the inlet duct and the chamber and would be difficult to remove with the aid of the suction means.

It is an object of the present invention to improve the gas filter device according to the above-mentioned prior proposal, both as regards precipitation of particles before the gas enters the filter units and as regards purging the device of the particles which are precipitated here.

With the device according to the present invention, having the characteristic features specified above, the particle-laden gas enters the chambers, preferably vertically, and then flows dowardly in them a much greater distance than would be possible in the case of the earlier proposal mentioned above, and it decelerates as it flows downwardly and then flows upwardly into the filter units, leaving behind at the bottom of each chamber, which in this case may rightly be called a deceleration chamber, more particles than would be the case with the prior proposal. These particles would not be difficult to remove by the suction means in the case of the present invention, especially if they fall through the removed particle exits and on to the second baffle.

The present invention will now be further described, by way of example, with reference to the accompanying drawings, in which:

FIGS. 6 and 7 are schematic sectional side views of two further embodiments of a filter device according to the present invention.

Figure 1:
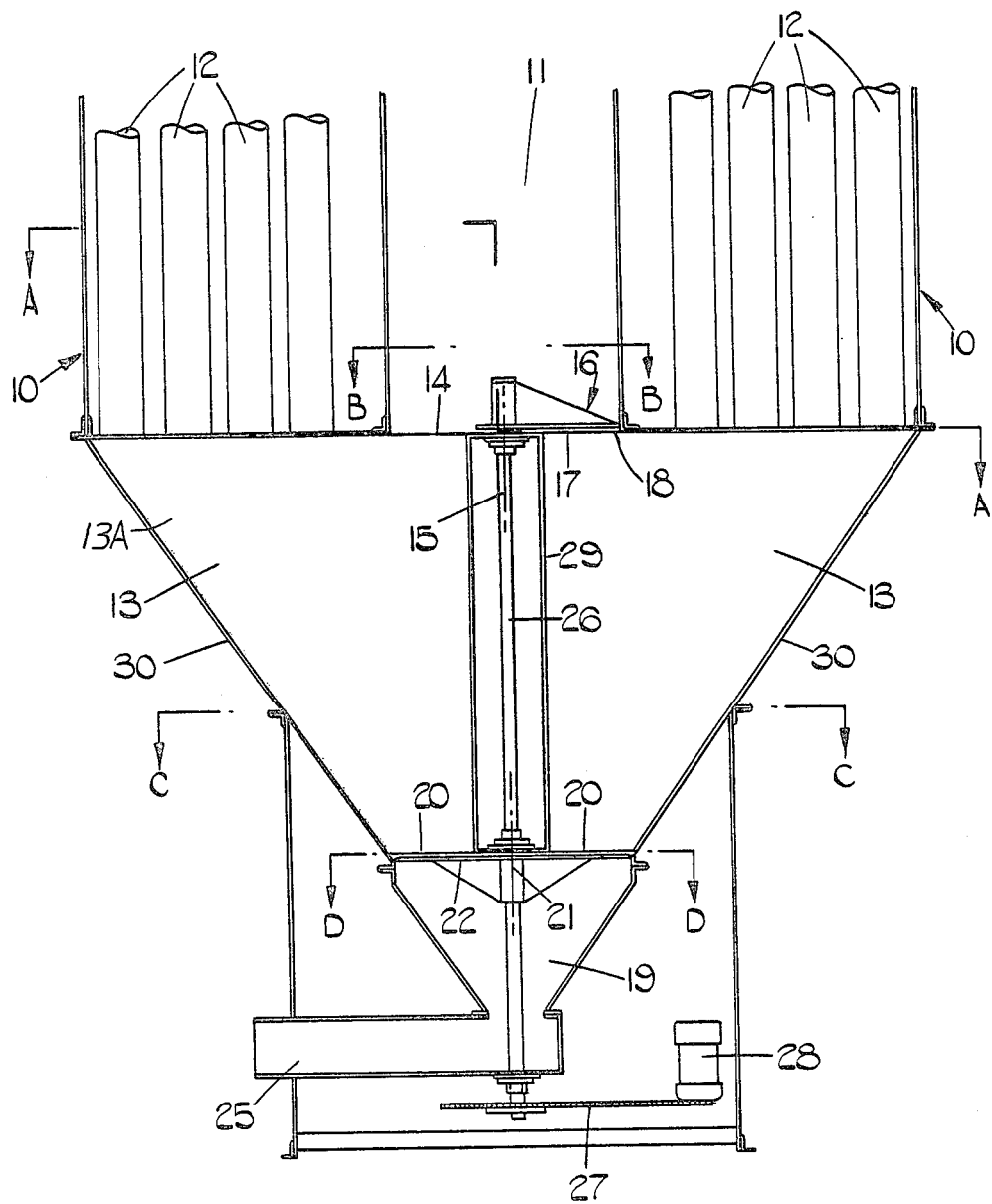
FIG. 1 is a schematic sectional side view of a first embodiment of a filter device according to the present invention.
Figure 2:
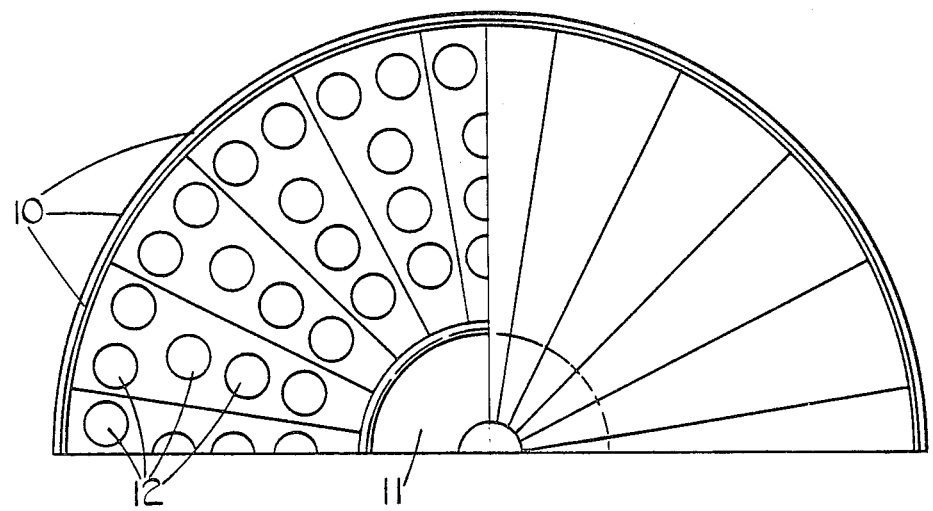
FIG. 2 is a part-section taken along the line A—A in FIG. 1.
Figure 4:
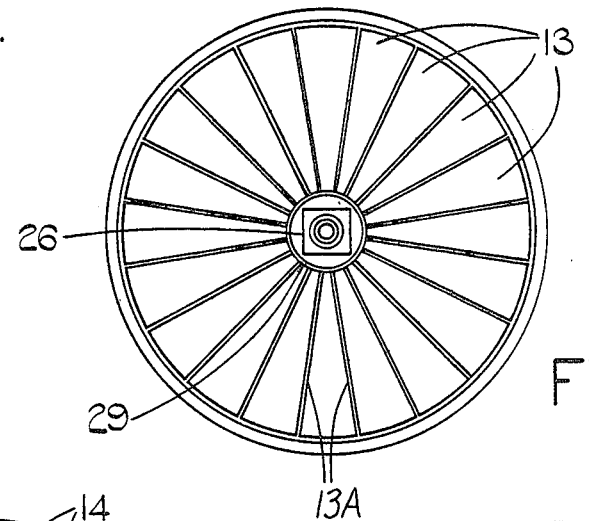
FIGS. 3 to 5 are sections taken respectively along the lines B—B, C—C, and D—D in FIG. 1.
Figure 3:
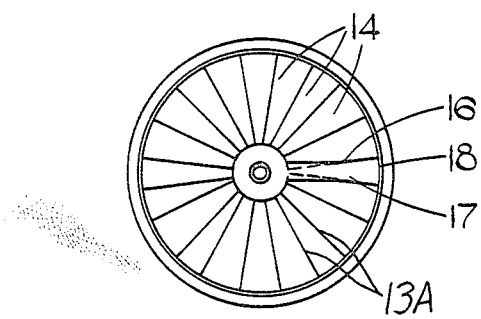

Referring first to FIGS. 1 to 5, the filter device shown therein comprises generally a series of wedge-shaped filter units 10 disposed in an annulus and surrounding a central, vertically oriented inlet duct 11. In the illustrated construction, twenty such filter units are provided, and the inlet duct 11 is of round transverse cross-section, although the latter could equally well be square or any other suitable shape. Each filter unit 10 contains a plurality of vertically disposed filter bags 12 which are open at their lower ends. At the bottom of each filter unit 10 there is provided a respective plenum or deceleration chamber 13 which communicates with the lower end of the inlet duct 11 by way of a respective sector-shaped inlet 14.

The chamber 13 are formed between vertical plates 13A which radiate from and abut a vertical tube 29, the axis 21 of which is also the axis of the duct 11, and they abut a frusto-conical wall 30. Therefore the chambers 13 are wedge-shaped and they are distributed around the axis of the inlet duct 11 and near the bottom of the inlet duct and they radiate outwardly from a central region, where the tube 29 is situated, which is vertically below the bottom of the inlet duct 11. The inner, narrow, sides of the chambes 13 are vertically below the bottom of the inlet duct 11 and at the tops of these sides of the chambers 13 there are the inlets 14 to these chambers, these also being vertically below the bottom of the inlet duct 11, which means that a vertical line passing through an inlet 14 also passes along the interior of the duct 11. There is no special construction of the inlets 14; looking downwardly through the duct 11 one merely sees the upper edges of the plates 13A, apart from a baffle 16. The inlets 14 are arranged in an annulus around an axis 15 and are disposed in a common plane perpendicular to the axis. A blast gate or baffle 16 is rotatable about the axis 15 to close off the inlets 14 successively and one at a time, the baffle 16 including a portion 17 which is parallel to the plane of the inlets 14 and which extends radially of the axis 15. A radially outer periphery 18 of the portion 17, which sweeps around the bottom edge of the inlet duct 11 as the baffle 16 is rotated, forms a knife-edge.

Each deceleration chamber 13 also communicates with a purge manifold 19 by way of a respective sector-shaped outlet 20, the outlets 20 being arranged in an annulus around an axis 21 and being disposed in a common plane perpendicular to the axis 21. The outlets 20 serve as particle exits from the chambers, substantially all of each exit being vertically below the bottom of the inlet duct 11. Again, there is no special construction of these exits; looking upwardly at them one merely sees the lower edges of the plates 13A. A baffle in the form of a circular plate 22 made of highly polished stainless steel is rotatable about the axis 21 to bring a radial slot 23 FIG. 5 therein successively into registration with the outlets 20, such that as the plate 22 is rotated the deceleration chambers 13 are successively and one at a time placed in communication with the purge manifold 19. A leading edge 24 of the slot 23 with respect to the direction of rotation of the plate 22 is formed as a knife-edge. The manifoled 19 is in turn connected by way of a duct 25 to a fan (not shown) disposed externally of the filter-device.

The baffles 16 and 22 are mounted on a common shaft 26 for synchronous rotation by means of a chain drive 27 and an electric motor 28, such that at any given time the deceleration chamber 13 whose inlet 14 is closed off by the baffle 16 is in communication with the purge manifold 19 via the slot 23 in the baffle 22. The shaft 26 is protected from particles entrained in the gas flowing through the device by means of a tube 29.

The above-described filter device operates as follows. Particle-laden gas (such as air from industrial premises) is passed downwardly through the inlet duct 11 and flows through those inlets 14 which are not at that time closed off by the baffle 16 into the respective deceleration chambers 13, where it is decelerated. At this time, any large or relatively heavy particles entrained in the gas flow are deposited by the action of gravity on the upper surface of the baffle 22. As the baffle 22 is rotated, the side walls of the deceleration chambers 13 sweep this surface, and the accumulated particles thereon are deposited into the purge manifold 19 through the slot 23 when the latter comes into registration with the respective chamber 13. From the chambers 13, the particle-laden gas flows upwardly through the filter bags 12 which filter out the extrained particles from the gas stream. The gas, free from particles, which passes through the fabric of the filter bags 12 is discharged through a discharge manifold (not shown).

Figure 5:
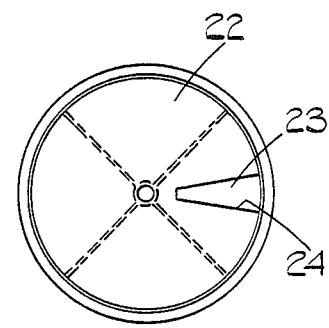

As the baffles 16 and 22 are rotated, each filter unit 10 is intermittently subjected to a reverse gas flow to purge the filtered-out particles therefrom. This reverse flow occurs when the baffle 16 closes off the inlet 14 of the respective deceleration chamber 13 and the baffle 22 opens the outlet 20 thereof, such that the filter unit 10 is connected to the aforementioned fan by way of the purge manifold 19 and the duct 25. The particles purged from the filter units flow from the duct 25 to a particle separator, such as a cyclone or a high-efficiency grit arrester. The gas in which these particles are entrained can be recirculated. The embodiments according to FIGS. 6 and 7 have filter units 10 as shown in FIG. 5.

In the embodiment of FIGS. 1 to 5, the inlets 14 and the outlets 20 are disposed in radially inner parts of their respective deceleration chambers 13, and only the radially outer side walls 30 of the chambers 13 are inclined to the horizontal. FIG. 6 illustrates a modified arrangement wherein both the radially inner and outer side walls of the chambers 13 are inclined, and a duct 31, which is not regarded as part of the chamber, is connected at one end to the removed particle outlet 20 at the bottom of the chamber, whereas the other end 20A is opened and closed by the baffle 22 which, therefore, connects the outlet 20 to and closes off the outlet 20 from the manifold 19. By inclining both of the side walls in this manner, there is little tendency for particles to accumlate in the deceleration chambers 13 during purging. In the example according to FIG. 7, each chamber 13 includes a duct 31, which connects the part of the chamber 13 at the bottom of the wall 32 to the removed particle exit 20.

FIG. 7 illustrates a modification of the arrangement shown in FIG. 6, wherein the duct 31 associated with each chamber 13 is defined beneath a closed frusto-conical baffle 32 which surrounds the tube 29. It will be manifest that the radially inner side wall of each chamber 13 is formed by the baffle 32 and, as with the arrangement shown in FIG. 6, is inclined to reduce particles accumulating in the chamber 13 during purging.

In all of the above-described embodiments, the baffle 16 closes off one inlet 14 at a time and the baffle 22 opens one outlet 20 at a time. The baffles can, however, be arranged to close off more than one inlet and open more than one outlet at a time. Also, instead of being driven by a common drive, the baffles can be driven separately as long as synchronism of their rotation is maintained. In either case, the speed of rotation of the baffles will be determined by the type of particles being filtered and also the loading of these particles in the gas.

I claim:

1. A filter device for removing particles from a particle-laden gas, said filter device comprising an inlet duct arranged to provide a downward flow therethrough of a particle-laden gas, a plurality of filter units distributed about said inlet duct, a plurality of vertical plates radiating outwardly from a central region which is vertically below the bottom of the inlet duct, said plates defining between them a ring of decelaration chambers which are wedge-shaped and have inner narrow sides and outer wider sides, the inner narrow sides of said deceleration chambers being vertically below the bottom of said inlet duct, said deceleration chambers having inlets which are at the tops of their inner sides and vertically below the bottom of said inlet duct and receive particle-laden gas from said inlet duct, each of said deceleration chambers having at the top of a wider part thereof a gas exit to at least one of said filter units and having at its bottom a removed particle exit, whereby particle-laded gas entering each deceleration chamber first moves towards said removed particle exit and then substantially reverses its flow direction to exit through said gas exit, leaving behind some large particles at the bottom of that deceleration chamber, a first baffle mounted to be turned about a substantially vertical axis so as to pass above and close to said inlets and close off said inlets successively and at least one at a time as said first baffle is turned, an outlet duct, suction means coupled to said outlet duct, said outlet duct positioned and arranged to carry away particles removed from said deceleration chambers and said filter units via said removed particle exits by said suction means coupled to said outlet duct, a second baffle mounted to be turned about a substantially vertical axis and thereby provide communication of said removed particle exits at least one at a time to said outlet duct while the other removed particle exits are closed off from said outlet duct, and drive means for turning said first and second baffles in synchronism so that when the inlet of one deceleration chamber is closed off from said inlet duct the removed particle exit of the same deceleration chamber is in communication with said outlet duct.

2. The filter device according to claim 1, wherein said drive means includes a common shaft and said first and second baffles are mounted on said common shaft to be turned thereby.

3. The filter device according to claim 1, wherein said plates are positioned such that said inlets are arranged in an annulus centered on said axis about which said first baffle turns and said first baffle includes a portion extending radially of said axis, said portion having a radially outer periphery which forms a knife-edge.

4. The filter device according to claim 1, wherein said removed particle exits are disposed in a common plane perpendicular to said axis about which said second baffle turns.

5. The filter device according to claim 1, wherein said removed particle exits are arranged in an annulus centered on said axis about which the second baffle turns and said second baffle is in the form of a circular plate also centered on said axis, said circular plate having a radial slot therein through which the removed particle exits communicate with the outlet duct.

6. The filter device according to claim 5 wherein said radial slot has an edge which is formed as a knife-edge.

7. A filter device according to claim 1 in which said particle exits are vertically below the bottom of said inlet duct and in each deceleration chamber there is a clear, unimpeded vertical passage from the inlet to the particle exit.

* * * * *